(12) United States Patent
Loveday et al.

(10) Patent No.: US 6,271,323 B1
(45) Date of Patent: *Aug. 7, 2001

(54) MIXED CATALYST COMPOUNDS, CATALYST SYSTEMS AND THEIR USE IN A POLYMERIZATION PROCESS

(75) Inventors: Donald R. Loveday; David H. McConville, both of Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/428,576

(22) Filed: Oct. 28, 1999

(51) Int. Cl.[7] ........................................ C08F 4/64
(52) U.S. Cl. ..................... 526/161; 526/113; 526/127; 526/128; 526/129; 526/172; 526/348.2; 526/348.5; 526/348.6
(58) Field of Search ..................... 526/127, 128, 526/129, 172, 941, 943, 348.2, 348.5, 348.6, 113, 161

(56) References Cited

U.S. PATENT DOCUMENTS

| | | | |
|---|---|---|---|
| 4,057,565 | 11/1977 | Manzer | 260/429 |
| 5,426,243 | 6/1995 | Lecouve | 568/737 |
| 5,637,660 | 6/1997 | Nagy et al. | 526/160 |
| 5,707,913 | 1/1998 | Schlund et al. | 502/102 |
| 5,726,115 | 3/1998 | Horton et al. | 502/152 |
| 5,798,427 | 8/1998 | Foster et al. | 526/352 |
| 5,889,128 | * 3/1999 | Schrock et al. | 526/107 |

FOREIGN PATENT DOCUMENTS

| | | |
|---|---|---|
| 0197310 A2 | 10/1986 | (EP) . |
| 0197310 A3 | 10/1986 | (EP) . |
| 0241560 A1 | 10/1987 | (EP) . |
| 0751142 A2 | 1/1997 | (EP) . |
| 0816372 A2 | 1/1998 | (EP) . |
| 0816384 A2 | 1/1998 | (EP) . |
| 0816384 A3 | 1/1998 | (EP) . |
| 0803520 B1 | 12/1998 | (EP) . |
| 0890575 A1 | 1/1999 | (EP) . |
| 0893454 A1 | 1/1999 | (EP) . |
| 02-78663 | 3/1990 | (JP) . |
| 08-081415 | 7/1996 | (JP) . |

(List continued on next page.)

OTHER PUBLICATIONS

*Organometallics*, Bei et al., vol. 16, pp. 3282–3302 (1997).
*Organometallics*, Grubbs, vol. 17, pp. 3149–3151 (1998).
*Macromolecules*, Repo, vol. 30, pp. 171–175 (1997).
*Polyhedron*, Guerin et al., vol. 17 (5–6), pp. 917–923 (1998).
*Inorganic Chemistry*, Furhman/Kempe et al., vol. 35, pp. 6742–6745 (1996).
*Organometallics*, Guerin et al., vol. 15 (26), pp. 5586–5590 (1996).
*Organometallics*, Guerin et al., vol. 17 (23), pp. 5172–5177 (1998).
*Macromolecular Chemistry and Physics*, Silvestro et al., vol. 197, No. 10, pp. 3209–3228 (1996).
*Journal of Organometallic Chemistry*, Harkonen et al., vol. 519, No. 1, pp. 205–208 (1996).

(List continued on next page.)

*Primary Examiner*—David W. Wu
*Assistant Examiner*—William Cheung
(74) *Attorney, Agent, or Firm*—Jaimes Sher; Lisa Kimes Jones (57) ABSTRACT

The present invention relates to mixed catalyst compositions of a Group 15 containing hafnium catalyst compound and a bulky ligand metallocene-type catalyst compound, a unsupported and supported catalyst systems thereof and to a process for polymerizing olefin(s) utilizing them.

15 Claims, 1 Drawing Sheet

FOREIGN PATENT DOCUMENTS

| | | |
|---|---|---|
| 08-277307 | 10/1996 | (JP) . |
| 10-7712 | 1/1998 | (JP) . |
| 10-45904 | 2/1998 | (JP) . |
| WO 91/12285 | 8/1991 | (WO) . |
| WO 92/12162 | 7/1992 | (WO) . |
| WO 94/21700 | 9/1994 | (WO) . |
| WO 96/08498 | 3/1996 | (WO) . |
| WO 97/42197 | 11/1997 | (WO) . |
| WO 97/45434 | 12/1997 | (WO) . |
| WO 97/48736 | 12/1997 | (WO) . |
| WO 97/48735 * | 12/1997 | (WO) . |
| WO 98/27124 | 6/1998 | (WO) . |
| WO 98/30569 | 7/1998 | (WO) . |
| WO 98/30612 | 7/1998 | (WO) . |
| WO 98/34964 | 8/1998 | (WO) . |
| WO 98/37109 | 8/1998 | (WO) . |
| WO 98/46651 | 10/1998 | (WO) . |
| WO 98/55467 | 12/1998 | (WO) . |
| WO 99/02472 | 1/1999 | (WO) . |
| WO 99/02536 | 1/1999 | (WO) . |
| WO 99/12981 * | 3/1999 | (WO) . |

OTHER PUBLICATIONS

*J. Chem. Soc. Dalton Trans.*, Cloke et al., pp. 25–30 (1995).
*Journal of Organometallic Chemistry*, Clark et al., vol. 501, pp. 333–340 (1995).
*J. Am. Chem. Soc.*, Baumann et al., vol. 119, pp. 3830–3831 (1997).
*J. Am. Chem. Soc.*, Scollard et al., vol. 118, pp. 10008–10009 (1996).
*Organometallics*, Horton et al., vol. 15, pp. 2672–2674 (1996).
*Organometallics*, Guerin et al., vol. 15, pp. 5085–5089 (1996).

* cited by examiner

Figure 1

MIXED CATALYST COMPOUNDS, CATALYST SYSTEMS AND THEIR USE IN A POLYMERIZATION PROCESS

FIELD OF THE INVENTION

The present invention relates to a catalyst composition of Group 15 containing hafnium transition metal catalyst compound and a bulky ligand metallocene-type catalyst compound a catalysts system thereof and its use in the polymerization of olefin(s).

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene-type catalyst systems.

More recently, developments have lead to the discovery of anionic, multidentate heteroatom ligands as discussed by the following articles: (1) Kempe et al., "Aminopyridinato Ligands—New Directions and Limitations", 80$^{th}$ Canadian Society for Chemistry Meeting, Windsor, Ontario, Canada, Jun. 1–4, 1997; (2) Kempe et al., *Inorg. Chem.* 1996 vol 35 6742; (3) Jordan et al. of polyolefm catalysts based on hydroxyquinolines (Bei, X.; Swenson, D. C.; Jordan, R. F., *Organometallics* 1997, 16, 3282); (4) Horton, et. al., "Cati Diamide Ligand: New Alkene Polymerization Catalysts", Organometallics, 1996, 15, 2672–2674 relates to tridentate zirconium complexes; (5) Baumann, et al., "Synthesis of Titanium and Zirconium Complexes that Contain the Tridentate Diamido Ligand [((t-Bu-$_6$)N—O—C$_6$H$_4$)$_2$O]$^{2-}${[NON}$^{2-}$) and the Living Polymerization of 1-Hexene by Activated [NON]ZrMe2", Journal of the American Chemical Society, Vol. 119, pp. 3830–3831; (6) Cloke et al., "Zirconium Complexes incorporating the New Tridentate Diamide Ligand [(Me$_3$Si)N{CH$_2$CH$_2$N(SiMe$_3$)})$_2$]$^{2-}$(L); the Crystal Structure of [Zr(BH$_4$)$_2$L] and [ZrCl{CH(SiMe$_3$)$_2$}L]", J. Chem. Soc. Dalton Trans, pp. 25–30, 1995; (7) Clark et al., "Titanium (IV) complexes incorporating the aminodiamide ligand [(SiMe$_3$)N{CH$_2$CH$_2$N (SiMe$_3$)}$_2$]$^{2-}$(L); the X-ray crystal structure of [TiMe$_2$(L)] and [TiCl{CH(SiMe$_3$)$_2$}(L)]", Journal of Organometallic Chemistry, Vol 50, pp. 333–340, 1995; (8) Scollard et al., "Living Polymerization of alpha-olefins by Chelating Diamide Complexes of Titanium", J. Am. Chem. Soc., Vol 118, No. 41, pp. 10008–10009, 1996; and (9) Guerin et al., "Conformationally Rigid Diamide Complexes: Synthesis and Structure of Titanium (IV) Alkyl Derivatives", Organometallics, Vol 15, No. 24, pp. 5085–5089, 1996.

Furthermore, U.S. Pat. No. 5,576,460 describes a preparation of arylamine ligands and U.S. Pat. No. 5,889,128 discloses a process for the living polymerization of olefins using initiators having a metal atom and a ligand having two group 15 atoms and a group 16 atom or three group 15 atoms. EP 893 454 A1 also describes preferably titanium transition metal amide compounds. In addition, U.S. Pat. No. 5,318,935 discusses amido transition metal compounds and catalyst systems especially for the producing isotactic polypropylene. Polymerization catalysts containing bidentate and tridentate ligands are further discussed in U.S. Pat. No. 5,506,184.

Traditional bulky ligand metallocene-type catalyst systems produce polymers that are in some situations more difficult to process into film, for example using old extrusion equipment. One technique to improve these polymers is to blend them with other polymers with the intent to create a blend having the desired properties that each component individually would have. While the two polymer blends tend to be more processable, it is expensive and adds a cumbersome blending step to the manufacturing/fabrication process.

Higher molecular weight confers desirable polymer mechanical properties and stable bubble formation in the production of films. However, this property also inhibits extrusion processing by increasing backpressure in extruders, promotes melt fracture defects in the inflating bubble and potentially, promotes too high a degree of orientation in the finished film. The anionic, multidentate heteroatom containing catalyst systems tend to produce a very high molecular weight polymer. To remedy this, one may form a secondary, minor component of lower molecular weight polymer to reduce extruder backpressure and inhibit melt fracture. Several industrial processes operate on this principle using multiple reactor technology to produce a processable bimodal molecular weight distribution (MWD) high density polyethylene (HDPE) product. HIZEX™, a Mitsui Chemicals HDPE product, is considered the worldwide standard. HIZEX™ is produced in a costly two or more reactor process. In a multiple reactor process, each reactor produces a single component of the final product.

Others in the art have tried to produce two polymers together at the same time in the same reactor using two different catalysts. PCT patent application WO 99/03899 discloses using a typical bulky ligand metallocene-type catalyst and a conventional-type Ziegler-Natta catalyst in the same reactor to produce a bimodal polyolefin. Using two different types of catalysts, however, result in a polymer whose characteristics cannot be predicted from those of the polymers that each catalyst would produce if utilized separately. This unpredictability occurs, for example, from competition or other influence between the catalyst or catalyst systems used.

Polyethylenes with a higher density and a higher molecular weight are valued in film applications requiring high stiffness, good toughness and high throughput. Such polymers are also valued in pipe applications requiring stiffness, toughness and long-term durability, and particularly resistance to environmental stress cracking.

Thus, there is a desire for a combination of catalysts capable of producing processable polyethylene polymers in preferably a single reactor having desirable combinations of processing, mechanical and optical properties.

SUMMARY OF THE INVENTION

This invention provides for an improved catalyst compound, a catalyst system and for its use in a polymerizing process.

In one embodiment, the invention is directed to a catalyst composition including a Group 15 containing hafnium catalyst compound and a bulky ligand metallocene-type catalyst compound, a catalyst system of the catalyst composition and to its use in the polymerization of olefin(s).

In another embodiment, the invention is directed to a catalyst composition of a Group 15 containing bidentate or tridentate ligated hafnium transition metal catalyst compound and a bulky ligand metallocene-type catalyst compound, a catalyst system thereof and to its use in the polymerization of olefin(s).

In another embodiment, the invention is directed to a catalyst composition of a catalyst compound having a hafnium transition metal bound to at least one leaving group and also bound to at least two Group 15 atoms, at least one of which is also bound to a Group 15 or 16 atom through another group, and a bulky ligand metallocene-type catalyst composition; a catalyst system of the catalyst composition; and to its use in the polymerization of olefin(s).

In still another embodiment, the invention is directed to a method for supporting the multidentate hafnium based catalyst compounds and the bulky ligand metallocene-type catalyst compounds on the same or different supports; to the supported catalyst system itself; and to their use in the polymerization of olefin(s).

In another embodiment, the invention is directed to a process for polymerizing olefin(s), particularly in a gas phase or slurry phase process, utilizing any one of the catalyst systems or supports catalyst systems discussed above, more preferably in a continuous gas phase single reactor process producing a multimodal polymer.

DETAILED DESCRIPTION OF THE INVENTION

Introduction

Figure 1:
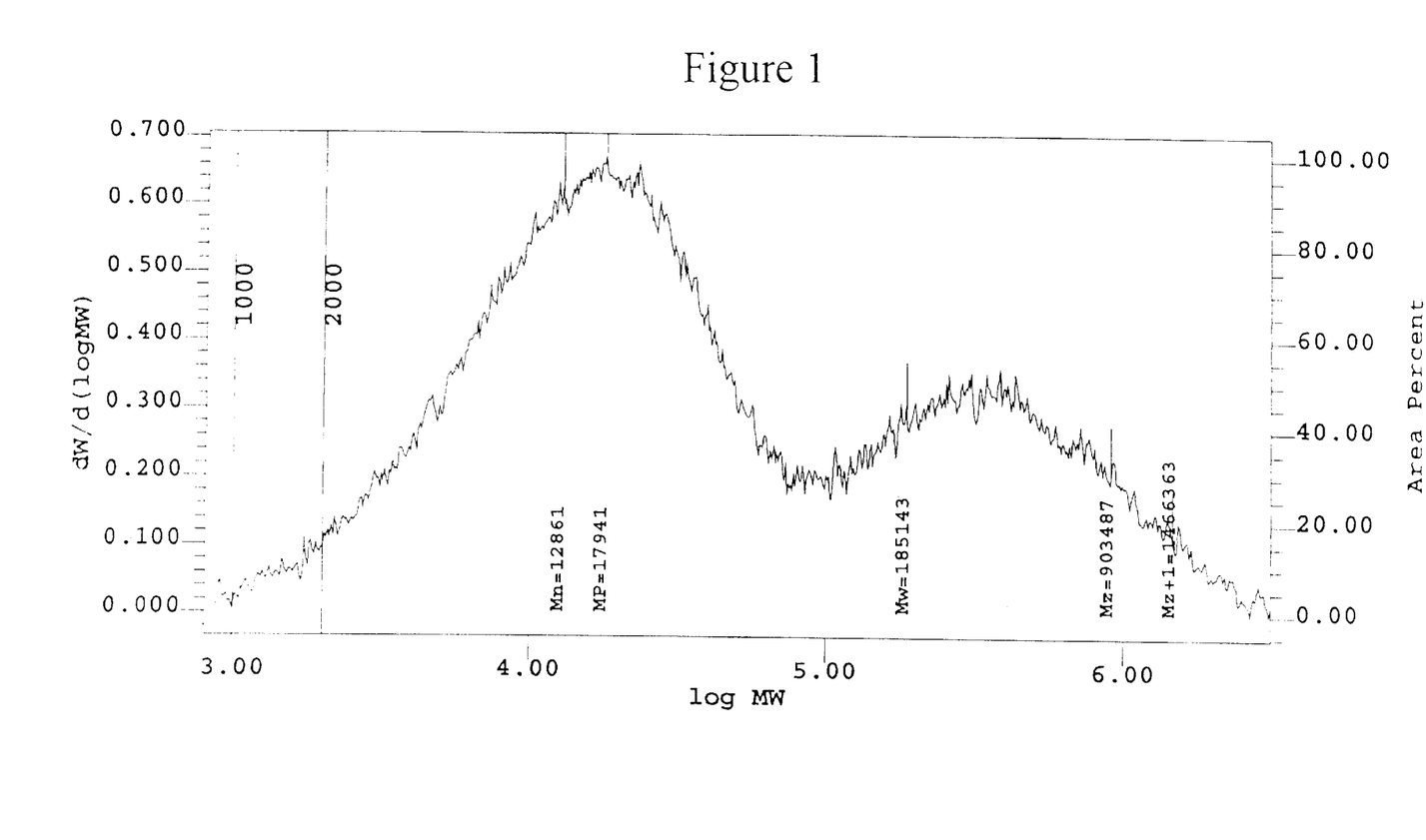
FIG. 1 is a gel permeation chromatogram representative of the polymers of the invention.

It has unexpectedly been found that the hafnium based Group 15 containing catalyst compounds exhibit a much higher catalyst productivity as compared to their zirconium or titanium analogs. Furthermore, it has also been discovered that these Group 15 containing hafnium catalyst compounds provide for an improved supported catalysts system, particularly for use in slurry phase or gas phase polymerizations. The polymer produced using these Group 15 containing compounds typically have a very high molecular weight. Bulky ligand metallocene-type catalysts typically have a high catalyst productivity and generally produce polymers having a lower molecular weight. As a result of this discovery it is now possible to provide for a mixed catalyst system using components each of which having a commercially acceptable level of productivity, especially when used in a supported form in a slurry or gas phase polymerization process, particularly in a continuous gas phase process. Also, the mixed catalysts of the invention are particularly useful in producing a multimodal, especially a bimodal, polymer having a high molecular weight and a low molecular weight component.

Group 15 Containing Hafnium Catalyst Compound and Catalyst Systems

In one embodiment, the hafnium based catalyst compounds of the invention are Group 15 bidentate or tridentate ligated hafnium transition metal compound, the preferred Group 15 elements are nitrogen and/or phosphorous, most preferably nitrogen.

The Group 15 containing hafnium catalyst compounds of the invention generally include a hafnium metal atom bound to at least one leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group, which may be a hydrocarbon group, preferably a hydrocarbon group having 1 to 20 carbon atoms, a heteroatom containing group, preferably silicon, germanium, tin, lead, or phosphorus. In this embodiment, it is further preferred that the Group 15 or 16 atom be bound to nothing or a hydrogen, a Group 14 atom containing group, a halogen, or a heteroatom containing group. Additionally in these embodiment, it is preferred that each of the two Group 15 atoms are also bound to a cyclic group that may optionally be bound to hydrogen, a halogen, a heteroatom or a hydrocarbyl group, or a heteroatom containing group.

In an embodiment of the invention, the Group 15 containing hafnium compound of the invention is represented by the formulae:

Formula (I)

or

Formula (II)

wherein M is hafnium; each X is independently a leaving group, preferably an anionic leaving group, and more preferably hydrogen, a hydrocarbyl group, a heteroatom or a halogen, and most preferably an alkyl;

y is 0 or 1 (when y is 0 group L' is absent);

n is the oxidation state of M, preferably +2, +3 or +4, and more preferably +4;

m is the formal charge of the YZL or the YZL' ligand, preferably 0, −1, −2 or −3, and more preferably −2;

L is a Group 15 or 16 element, preferably nitrogen;

L' is a Group 15 or 16 element or Group 14 containing group, preferably carbon, silicon or germanium;

Y is a Group 15 element, preferably nitrogen or phosphorus, and more preferably nitrogen;

Z is a Group 15 element, preferably nitrogen or phosphorus, and more preferably nitrogen;

$R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or arylalkyl group, more preferably a linear, branched or cyclic $C_2$ to $C_{20}$ alkyl group, most preferably a $C_2$ to $C_6$ hydrocarbon group;

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen;

$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ arylalkyl group, or a heteroatom containing group, for example $PR_3$, where R is an alkyl group;

$R^1$ and $R^2$ may be interconnected to each other, and/or $R^4$ and $R^5$ may be interconnected to each other;

$R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent; and

R* is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloallyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof An arylalkyl group is defined to be a substituted aryl group.

In a preferred embodiment $R^4$ and $R^5$ are independently a group represented by the following formula:

Formula (III)

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched allyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

Formula (IV)

In this embodiment, M is hafnium; each of L, Y, and Z is nitrogen; each of $R^1$ and $R^2$ is a hydrocarbyl group, preferably —$CH_2$—$CH_2$—; $R^3$ is hydrogen; and $R^6$ and $R^7$ are absent.

In a particularly preferred embodiment the Group 15 containing metal compound is represented by the formula:

Compound (1)

Ph equals phenyl. For convenience the above formula will be referred to as Compound (1) (Hf—HN3).

The Group 15 containing hafnium catalyst compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference. A preferred direct synthesis of these compounds comprises reacting the neutral ligand, (see for example YZL or YZL' of Formula I or II) with $HfX_n$, is the oxidation state of Hf, each X is an anionic group, such as halide, in a non-coordinating or weakly coordinating solvent, such as ether, toluene, xylene, benzene, methylene chloride, and/or hexane or other solvent having a boiling point above 60° C., at about 20° C. to about 150° C. (preferably 20° C. to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing hafnium catalyst compound is prepared by a method comprising reacting a neutral ligand, (see for example YZL or YZL' of formula 1 or 2) with a compound represented by the formula $HfX_n$ (where n is the oxidation state of Hf, each X is an anionic leaving group) in a non-coordinating or weakly coordinating solvent, at about 20° C. or above, preferably at about 20° C. to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopenta-cyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethyl-boron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, tifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene-type catalyst compounds of the invention include those of formular (I) where $L^A$ and $L^B$ are bridged to each other by at least one bridging group, A, such that the formula is represented by $$L^A A L^B M Q_n \qquad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, $R'P$, where $R'$ is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more $R'$ may be joined to form a ring or ring system. In one embodiment, the bridged, bulky ligand metallocene-type catalyst compounds of formula (II) have two or more bridging groups A (EP 664 301 B1).

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, W096/00244, WO 97/15602 and WO 99/20637 and U.S. Pat. Nos. 5,057, 475, 5,096,867, 5,055,438, 5,198,401, 5,227,440 and 5,264, 405 and European publication EPA-0 420 436, all of which are herein fully incorporated by reference.

In this embodiment, the bulky ligand metallocene-type catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0,1 or 2. In formula (III) above, $L^C$, A and J form a fused ring system. In an embodiment, $L^C$ of formula (II) is as defined above for $L^A$, A, M and Q of formula (III) are as defined above in formula (I). In formula (IH J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$$L^D M Q_2 (YZ) X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene-type catalyst compounds are those described in PCT publications WO 99/01481 and WO 98/42664, which are fully incorporated herein by reference.

In one embodiment, the bulky ligand metallocene-type catalyst compound is represented by the formula:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also contemplated that in one embodiment, the bulky ligand metallocene-type catalysts of the invention described above include their structural or optical or enantiomeric isomers (meso and racemic isomers, for example see U.S. Pat. No. 5,852,143, incorporated herein by reference) and mixtures thereof.

Activator and Activation Methods

The above described Group 15 containing hafnium catalyst compounds and bulky ligand metallocene-type catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the Group 15 containing bidentate or tridentate ligated hafnium catalyst compounds and the bulky ligand metallocene-type catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral Group 15 containing hafnium catalyst compound to a catalytically active Group 15 containing hafnium cation and/or a neutral bulky ligand metallocene-type catalyst compound to a catalytically active bulky ligand metallocene-type cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral catalyst compound. While most of the publications discussed herein refer to a bulky ligand metallocene-type catalyst, it contemplated that the activators and activation methods utilized for these bully-ligand metallocene-type catalyst compounds are applicable to the Group 15 containing hafnium catalyst compounds of this invention.

In one embodiment, an activation method using ionizing ionic compounds not containing an active proton but capable of producing both a catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. No. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds as activators include trimethylaluminum, triethylaluminum, triisobutylaluminum, tri-n-hexylaiuminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patrnt application Ser. No. 08/285,380, filed Aug. 3, 1994 abandoned May 23, 1995, all of which are herein fully incorporated by reference.

Other activators include those described in PCT publication WO 98/07515 such as tris (2,2', 2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating catalyst compounds with perchlorates, periodates and iodates including their hydrates. WO 98/30602 and WO 98/30603 incorporated by reference describe the use of lithium (2,2'-bisphenyl-ditrimethylsilicate).4THF as an activator for a catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral catalyst compound or precursor to a catalyst cation capable of polymerizing olefins. Other activators or methods for activating a catalyst compound are described in for example, U.S. Pat. Nos. 5,849,852, 5,859, 653 and 5,869,723 and WO 98/32775, WO 99/42467 (dioctadecylmethylammonium-bis(tris(pentafluorophenyl) borane)benzimidazolide), which are herein incorporated by reference.

In another embodiment, the invention provides for one or more Group 15 containing hafnium catalyst compounds and one or more bulky ligand metallocene-type catalyst compounds used in combination with one or more activators discussed above.

It is further contemplated by the invention that a conventional-type catalyst compound can be combined with the Group 15 containing hafnium catalyst compounds and bulky ligand metallocene-type catalyst compounds of this invention.

Supports, Carriers and General Supporting Techniques

The above described Group 15 containing hafnium catalysts and bulky ligand metallocene-type catalysts may be combined with one or more support materials or carriers using one of the support methods well known in the art or as described below. For example, in a most preferred embodiment, the mixed catalyst system of the invention is in a supported form, for example deposited on, contacted with, vaporized with, bonded to, or incorporated within, adsorbed or absorbed in, or on, a support or carrier. Also, it is also contemplated that the bully ligand metallocene-type catalyst system is supported on a separate carrier than the Group 15 containing hafnium catalyst system, particulary for use in a multiple reactor system where one supported catalyst system is used in one reactor to produce the high molecular weight component and the other supported catalyst system is used in another reactor to produce the low molecular component.

The terms "support" or "carrier" are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene divinyl benzene polyolefins or polymeric compounds or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, and mixtures thereof Other useful supports include magnesia, titania, zirconia, magnesium chloride, montrnorillonite (EP-B1 0 511 665), phyllosilicate, zeolites, talc, clays and the like. Also, combinations of these support materials may be used, for example, silicachromium, silica-alumina, silica-titania and the like. Additional support materials may include those porous acrylic polymers described in EP 0 767 184 B1, which is incorporated herein by reference.

It is preferred that the carrier, most preferably an inorganic oxide, has a surface area in the range of from about 10 to about 100 m$^2$/g, pore volume in the range of from about 0.1 to about 4.0 cc/g and average particle size in the range of from about 5 to about 500 μm. More preferably, the surface area of the carrier is in the range of from about 50 to about 500 m$^2$/g, pore volume of from about 0.5 to about 3.5 cc/g and average particle size of from about 10 to about 200 μm. Most preferably the surface area of the carrier is in the range is from about 100 to about 400 m$^2$/g, pore volume from about 0.8 to about 5.0 cc/g and average particle size is from about 5 to about 100 μm. The average pore size of the carrier of the invention typically has pore size in the range of from 10 to 1000 Å, preferably 50 to about 500 A, and most preferably 75 to about 450 Å.

Examples of supporting the catalysts of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. Nos. 271,598 filed Jul. 7, 1994 U.S. Pat. No. 5,468,702, Nov. 21, 1995 and 788,736 filed Jan. 23, 1997 U.S. Pat. No. 6,090,740, Jul. 18, 2000 and PCT publications WO 95/32995, WO 95/14044, WO 96/06187 and WO 97/02297, and EP-B1-0 685 494 all of which are herein fully incorporated by reference.

There are various other methods in the art for supporting a polymerization catalyst compound or catalyst system of the invention. For example, the Group 15 containing hafnium catalyst compounds and bulky ligand metallocene-type catalyst compounds of the invention may contain a polymer bound ligand as described in U.S. Pat. Nos. 5,473, 202 and 5,770,755, which is herein filly incorporated by reference; the Group 15 containing hafnium catalyst compounds and the bulky ligand metallocene-type catalyst compounds of the invention may be spray dried as described in U.S. Pat. No. 5,648,310, which is herein fully incorporated by reference; the support used with the Group 15 containing hafnium catalyst compounds and the bulky ligand metallocene-type catalyst compounds of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a Group 15 containing hafnium catalyst system and the bulky ligand metallocene-type catalyst compounds that includes a surface modifier that is used in the preparation of the supported catalyst system as described in PCT publication WO 96/11960, which is herein fully incorporated by reference. The catalyst systems of the invention can be prepared in the presence of an olefin, for example hexene-1.

In a preferred embodiment, the Group 15 containing hafnium catalyst system and the bulky ligand metallocene-type catalyst compounds can be combined with a carboxylic acid salt of a metal ester, for example aluminum carboxylates such as aluminum mono, di- and tri- stearates, aluminum octoates, oleates and cyclohexylbutyrates, as described in U.S. application Ser. No. 09/113,216, filed Jul. 10, 1998 pending.

A preferred method for producing a supported Group 15 containing hafnium catalyst system and the bulky ligand metallocene-type catalyst system is described below and is described in U.S. application Ser. Nos. 265,533, filed Jun. 24, 1994 abandoned Apr. 18, 1995 and 265,532, filed Jun. 24, 1994 abandoned Mar. 29, 1995 and PCT publications WO 96/00245 and WO 96/00243 both published Jan. 4, 1996, all of which are herein fully incorporated by reference. This procedure is used either with the Group 15 containing hafnium catalyst compounds together with or separately from the bulky ligand metallocene-type catalyst compounds. In this preferred method, the catalyst compound or compounds are slurried in a liquid to form a solution and a separate solution is formed containing an activator and a liquid. The liquid may be any compatible solvent or other liquid capable of forming a solution or the like with the catalyst compound or compounds and/or activator of the invention. In the most preferred embodiment the liquid is a cyclic aliphatic or aromatic hydrocarbon, most preferably toluene. The catalyst compound or compounds and activator solutions are mixed together and added to a porous support such that the total volume of the catalyst compound or compounds solution and the activator solution or the catalyst compound or compounds solution and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The most preferred methods for supporting the Group 15 metal hafnium compounds of the invention are described in U.S. application Ser. No. 09/312,878, filed May 17, 1999 pending, which is fully incorporated herein by reference.

The Group 15 hafnium compound and the bulky ligand metallocene-type catalyst compound of the invention are combined at molar ratios of 1:1000 to 1000:1, preferably 1:99 to 99:1, preferably 10:90 to 90:10, more preferably 20:80 to 80:20, more preferably 30:70 to 70:30, more preferably 40:60 to 60:40.

In one embodiment, particulary in a slurry polymerization process, the loading of the total of Group 15 containing hafnium compound and the bulky ligand metallocene-type catalyst compound in $\mu$mmol per gram (g) of finished supported catalyst (includes the support material, the mixed catalysts and the activator) is about 40 $\mu$mmol per gram, preferably about 38 $\mu$mmol/g.

In one embodiment, particulary in a gas phase polymerization process, the loading of the total of Group 15 containing hafnium compound and the bulky ligand metallocene-type catalyst compound in mmol per gram of finished supported catalyst (includes the support material, the mixed catalysts and the activator) is less than 30 $\mu$mmol per gram, preferably less than 25 $\mu$mmol/g, more preferably less than 20 $\mu$mmol/gram.

In one embodiment of the invention, olefin(s), preferably $C_2$ to $C_{30}$ olefin(s) or alpha-olefin(s), preferably ethylene or propylene or combinations thereof are prepolymerized in the presence of a supported Group 15 containing hafnium catalyst and/or the bulky ligand metallocene-type catalyst of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

Polymerization Process

The catalyst systems, supported catalyst systems or compositions of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference A preferred process of the invention is where the process, preferably a slurry or gas phase process is operated in the presence of mixed catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352 and 5,763,543, which are herein fully incorporated by reference.

In an embodiment, the method of the invention provides for injecting an unsupported mixed catalyst system into a reactor, particularly a gas phase reactor. In one embodiment the polymerization catalysts of the invention are used in the unsupported form, preferably in a liquid form such as described in U.S. Pat. Nos. 5,317,036 and 5,693,727 and European publication EP-A-0 593 083, all of which are herein incorporated by reference. The polymerization catalyst or catalyst(s) in liquid form can be fed with an activator together or separately to a reactor using the injection methods described in PCT publication WO 97/46599, which is fully incorporated herein by reference.

The hydrogen concentration in the reactor is about 100 to 5000 ppm, preferably 200 to 2000 ppm, more preferably 250 to 1900 ppm, more preferably 300 to 1800 ppm, and more preferably 350 to 1700 ppm, more preferably 400 to 1600 ppm, more preferably 500 to 1500 ppm, more preferably 500 to 1400 ppm, more preferably 500 to 1200 ppm, more preferably 600 to 1200 ppm, preferably 700 to 1100 ppm, and more preferably 800 to 1000 ppm. The hydrogen concentration in the reactor being inversely proportional to the polymer's weight average molecular weight ($M_w$).

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers. Preferably the new polymers include polyethylene, and even more preferably include bimodal polyethylene produced in a single reactor. In addition to bimodal polymers, it is not beyond the scope of the present application to produce a unimodal or multi-modal polymer.

The polyolefins, particularly polyethylenes, produced by the present invention, have a density of 0.89 to 0.97 g/cm$^3$. Preferably, polyethylenes having a density of 0.910 to 0.965 g/cm$^3$, more preferably 0.915 to 0.960 g/cm$^3$, and even more preferably 0.920 to 0.955 g/cm$^3$ can be produced. In some embodiments, a density of 0.915 to 0.940 g/cm$^3$ would be preferred, in other embodiments densities of 0.930 to 0.970 g/cm$^3$ are preferred. Density is measured in accordance with ASTM-D-1238.

The polymers produced by the process of the invention typically have a molecular weight distribution, a weight average molecular weight to number average molecular weight ($M_w/M_n$ of greater than 5, particularly greater than 10.

Also, the polymers of the invention typically have a narrow composition distribution as measured by Composition Distribution Breadth Index (CDBI). Further details of determining the CDBI of a copolymer are known to those skilled in the art. See, for example, PCT Pat. Application WO 93/03093, published Feb. 18, 1993, which is fully incorporated herein by reference.

In another embodiment, polymers produced using a catalyst system of the invention have a CDBI less than 50%, more preferably less than 40%, and most preferably less than 30%.

In a preferred embodiment, the polyolefin recovered typically has a melt index $I_2$ (as measured by ASTM D-1238, Condition E at 190° C.) of about 0.01 to 1000 dg/min or less. In a preferred embodiment, the polyolefin is ethylene homopolymer or copolymer. In a preferred embodiment for certain applications, such as films, pipes, molded articles and the like, a melt index of 10 dg/min or less is preferred. For some films and molded articles, a melt index of 1 dg/min or less is preferred. Polyethylene having a $I_2$ between 0.01 and 10 dg/min is preferred.

In a preferred embodiment the polymer produced herein has an $I_{21}$ (as measured by ASTM-D-1238-F, at 190 ° C.) of 0.1 to 100 dg/min, preferably 0.5 dg/min to 50 dg/min, more preferably 2 dg/min to 20 dg/min (especially for pipe applications), and most preferably for film applications from 5 dg/min to 10 dg/min.

The polymers of the invention in a preferred embodiment have a melt index ratio ($I_{21}/I_2$) ($I_{21}$ is measured by ASTM-D-1238-F) of from preferably greater than 80, more preferably greater than 90, even more preferably greater that 100, still even more preferably greater than 110 and most preferably greater than 120.

The Group 15 containing hafnium metal compound, when used alone, produces a high weight average molecular weight $M_w$ polymer such as for example above 100,000, preferably above 150,000, preferably above 200,000, preferably above 250,000, more preferably above 300,000).

The bulky ligand metallocene-type catalyst compound, when use alone produces a low weight average molecular weight polymer such as for example below 100,000, preferably below 80,000, more preferably below 60,000, still more preferably below 50,000, still even more preferably below 40,000, and most preferably less than 30,000 and greater than 5,000.

In another embodiment the polymer has one or more of the following properties in addition to a combination of those above:

(a) $M_w/M_n$ of between 15 and 80, preferably between 20 and 60, preferably between 20 and 40. Molecular weight ($M_w$ and $M_n$ are measured as described below in the examples section;

(b) a density (as measured by ASTM 2839) of 0.94 to 0.970 g/cm³; preferably 0.945 to 0.965 g/cm³; preferably 0.945 g/cm³ to 0.960 g/cm³;

(c) a residual metal content of 5.0 ppm transition metal or less, preferably 2.0 ppm transition metal or less, preferably 1.8 ppm transition metal or less, preferably 1.6 ppm transition metal or less, preferably 1.5 ppm transition metal or less, preferably 2.0 ppm or less of Group 4 metal, preferably 1.8 ppm or less of Group 4 metal, preferably 1.6 ppm or less of Group 4 metal, preferably 1.5 ppm or less of Group 4 metal (as measured by Inductively Coupled Plasma Emission Spectroscopy (ICPES) run against commercially available standards, where the sample is heated so as to fully decompose all organics and the solvent comprises nitric acid and, if any support is present, another acid to dissolve any support (such as hydrofluoric acid to dissolve silica supports) is present; and/or (d) 35 weight percent or more high weight average molecular weight component, as measured by size-exclusion chromatography, preferably 40% or more. In a particularly preferred embodiment the higher molecular weight fraction is present at between 35 and 70 weight %, more preferably between 40 and 60 weight %.

In one preferred embodiment the catalyst composition described above is used to make a polyethylene having a density of between 0.94 and 0.970 g/cm³ (as measured by ASTM D 2839) and an $I_2$ of 0.5 or less g/10 min or less. In another embodiment the catalyst composition described above is used to make a polyethylene having an $I_{21}$ of less than 10 and a density of between about 0.940 and 0.950 g/cm³ or an $I_{21}$ of less than 20 and a density of about 0.945 g/cm³ or less.

In another embodiment, the polymers of the invention, including those described above, have an ash content less than 100 ppm, more preferably less than 75 ppm, and even more preferably less than 50 ppm is produced. In another embodiment, the ash contains negligibly small levels, trace amounts, of titanium as measured by Inductively Coupled Plasma/Atomic Emission Spectroscopy (ICPAES) as is well known in the art.

The polymers of the invention may be blended and/or coextruded with any other polymer. Non-limiting examples of other polymers include linear low density polyethylenes, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The following examples below use the bulky ligand metallocene-type catalyst compound (n-propyl-cyclopentadienyl)$_2$ZrCl$_2$ which was obtained from Boulder Scientific, Meade, Colo.

Example 1

Preparation of [(2,4,6-Me$_3$C$_6$H$_2$)NHCH$_2$]CH$_2$NH

A 2 L one-armed Schlenk flask was charged with a magnetic stir bar, diethylenetriamine (23.450 g, 0.227 mol), mesityl bromide (90.51 g, 0.455 mol), tris (dibenzylideneacetone)dipalladium (1.041 g, 1.14 mmol), racemic-2,2'bis(diphenylphosphino)-1,1'-binaphthyl (2.123 g, 3.41 mmol), sodium tert-butoxide (65.535 g, 0.682 mol), and toluene (800 mL). The reaction mixture was heated to 95° C. and stirred. After 4 days the reaction was complete, as judged by proton NMR spectroscopy. All solvent was removed under vacuum and the residues dissolved in diethyl ether (1 L). The ether was washed three times with water (1 L) and saturated aqueous NaCl (500 mL) and dried over magnesium sulfate. Removal of the ether in vacuo yielded a red oil which was dried at 70 C. for 12 h under vacuum (yield:71.10 g, 92%). $^1$H NMR δ6.83 (s, 4), 3.39 (br s, 2), 2.86 (t, 4), 2.49 (t, 4), 2.27 (s, 12), 2.21 (s, 6), 0.68 (br s, 1). $^{13}$C NMR δ143.74, 131.35, 129.83, 129.55, 50.17, 48.56, 20.70, 18.51.

Example 2

Preparation of $\{[(2,4,6\text{-Me}_3\text{C}_6\text{H}_2)\text{NCH}_2\text{CH}_2]_2\text{NH}\}\text{Hf}(\text{CH}_2\text{Ph})_2$(Hf—HN3)

A 250 mL round bottom flask was charged with a magnetic stir bar, tetrabenzyl hafnium (4.063 g, 7.482 mmol), and 150 mL of toluene under dry, oxygen-free nitrogen. Solid triamine ligand above (2.545 g, 7.495 mmol) was added with stirring over 1 minute (the desired compound precipitates). The volume of the slurry was reduced to 30 mL and 120 mL of pentane added with stirring. The solid pale yellow product was collected by filtration and dried under vacuum (4.562 g, 87% yield). $^1$H NMR ($\text{C}_6\text{D}_6$) δ7.21–6.79 (m, 12), 6.16 (d, 2), 3.39 (m, 2), 3.14 (m, 2), 2.65 (s, 6), 2.40 (s, 6), 2.35 (mn, 2), 2.23 (m, 2),2.23 (m, 2), 2.19 (s, 6) 1.60 (s, 2), 1.26 (s, 2), NH obscured.

Example 3

Preparation of Mixed Catalyst A

To 1.85 g of MAO (6.18 g of a 30 weight percent solution in toluene, Albemarle Corporation, Baton Rouge, La.) and 6.63 g of toluene in a 100 mL round bottom flask was added 0.139 g of Hf—HN3 and 0.025 g of (n-propyl-cyclopentadienyl)$_2$ZrCl$_2$. The solution was stirred for 10 minutes. 4.98 g of silica (Crossfield ES-70, calcined at 600° C., available from Crosfield Limited, Warrington, England) was added followed by mixing. The mixture was dried overnight under vacuum. Dry Witco Aluminum Stearate #22 (AlSt #22) (CH$_3$(CH$_2$)$_{16}$COO)$_2$Al—OH available from Witco Corporation, Memphis, Tenn. (0.28 g, 6 weight percent) was added with mixing to yielding 7.15 g of finished catalyst with a loading of 38 µmol/g of total catalyst, a total metal to aluminum ratio of 120:1, and a Hf—HN3 to (n-propyl-cyclopentadienyl)$_2$ZrCl$_2$ ratio of 3:1.

Example 4

Slurry-Phase Ethylene Polymerization

Polymerization is performed in the slurry-phase in a 1-liter autoclave reactor equipped with a mechanical stirrer, an external water jacket for temperature control, a septum inlet and vent line, and a regulated supply of dry nitrogen and ethylene. The reactor is dried and degassed at 160 C. Isobutane (400 mL) is added as a diluent and 0.7 mL of a 25 weight percent trioctyl aluminum solution in hexane is added as a scavenger using a gas tight syringe. The reactor was heated to 90 C. 0.100 g of Mixed Catalyst A was added with ethylene pressure and the reactor was pressurized with 136 psi (938 kPa) of ethylene. The polymerization was continued for 30 minutes while maintaining the reactor at 90°C. and 136 psi (938 kPa) by constant ethylene flow. The reaction was stopped by rapid cooling and venting. 83.0 g of ethylene homopolymer were recovered (I$_{21}$=3.5, activity is 4770 g PE/mmol cat.atm.h).

Example 5

Preparation of Mixed Catalyst B

To 7.95 g of MAO (26.50 g of a 30 weight percent solution in toluene, Albemarle Corporation, Baton Rouge, La.) and 94.41 g of toluene in a 1000 mL round bottom flask was added 0.596 g of Hf—HN3 and 0.108 g of (n-propyl-cyclopentadienyl)$_2$ZrCl$_2$. The solution was stirred for 10 minutes. 51.35 g of silica (Crossfield ES-70, calcined at 600° C., available from Crosfield Limited, Warrington, England) was added followed by mixing. The mixture was dried overnight under vacuum. Dry Witco Aluminum Stearate #22 (AlSt #22) (CH$_3$(CH$_2$)$_{16}$COO)$_2$Al—OH available from Witco Corporation, Memphis, Tenn. (2.40 g, 6 weight percent) was added with mixing to yielding 62.33 g of finished catalyst with a loading of 19 µmol/g of total catalyst and a total metal to Al ration of 120:1.

Example 6

Gas-Phase Ethylene-Hexene Polymerization

Mixed Catalyst B described above was used for ethylene-hexene copolymerization studies described below. A continuous fluid bed gas-phase reactor operated at 300 psi (2069 kPa) total pressure and 1.60 ft/s cycle gas velocity (49 cm/s)was used for determining catalyst efficiency, ability to incorporate comonomer (1-hexene) and molecular weight capability. The polymer properties are as follows: I$_{21}$=10.1, I$_{10}$=0.95, I$_2$=0.008, M$_w$=185,143, M$_n$=12,861, M$_w$/M$_n$=14.4, density 0.9487 g/cm$^3$. A summary of the process data is included in Table 1.

TABLE 1

| Process Conditions | Results |
|---|---|
| H$_2$ conc. (ppm) | 802 |
| C$_2$ conc. (mol %) | 34.9 |
| Hexene conc. (mol %) | 0.08 |
| H$_2$/C$_2$ Ratio | 23.0 |
| C$_6$/C$_2$ Ratio | 0.002 |
| Reactor Temp (° F./° C.) | 185/85.0 |
| Avg. Bed weight (g) | 1911 |
| Production (g/h) | 282 |
| Residence Time (h) | 6.8 |
| Productivity (g/g) - MB[1] | 696 |
| Total Bed Turnovers | 5.9 |

[1]MB = Material Balance

While the present invention has been described and illustrated by reference to particular embodiments, those of ordinary skill in the art will appreciate that the invention lends itself to variations not necessarily illustrated herein. For example, it is contemplated that two or more supported Group 15 containing catalyst compositions of the invention can be used with an unsupported bulky ligand metallocene-type catalyst compound. Also it is contemplated that a Group 15 containing hafnium catalyst compound can be used with a Group 15 containing titanium or zirconium catalyst compound and a bulky ligand metallocene-type catalyst compound. For this reason, then, reference should be made solely to the appended claims for purposes of determining the true scope of the present invention.

We claim:

1. A process for polymerizing olefin(s) in the presence of a catalyst system comprising a Group 15 containing bidentate or tridentate ligated hafnium catalyst compound, wherein the hafnium metal atom is bound to at least one leaving group and to at least two Group 15 atoms, and wherein at least one of the at least two Group 15 atoms is bound to a Group 15 or 16 atom through a bridging group; and a bulky ligand metallocene catalyst compound.

2. The process of claim 1 wherein the bridging group is selected from the group consisting of a $C_1$ to $C_{20}$ hydrocarbon group, a heteroatom containing group, silicon, germanium, tin, lead, and phosphorus.

3. The process of claim 2 wherein the Group 15 or 16 atom may also be bound to nothing, a hydrogen, a Group 14 atom containing group, a halogen, or a heteroatom containing group, and wherein each of the two Group 15 atoms are also bound to a cyclic group and may optionally be bound to hydrogen, a halogen, a heteroatom, a hydrocarbyl group, or a heteroatom containing group.

4. The process of claim 1 wherein the Group 15 containing hafnium compound is represented by the formulae:

Formula (I)

or

Formula (II)

wherein M is hafnium;
each X is independently a leaving group;
y is 0 or 1;
n is the oxidation state of M;
m is the formal charge of Y, Z and L or of Y, Z and L';
L is a Group 15 or 16 element;
L' is a Group 15 or 16 element or Group 14 containing group;
Y is a Group 15 element;
Z is a Group 15 element;
$R^1$ and $R^2$ are independently a $C_1$ to $C_{20}$ hydrocarbon group, a heteroatom containing group having up to twenty carbon atoms, silicon, germanium, tin, lead, or phosphorus;
$R^3$ is absent, a hydrocarbon group, hydrogen, a halogen, or a heteroatom containing group;
$R^4$ and $R^5$ are independently an alkyl group, an aryl group, a substituted aryl group, a cyclic alkyl group, a substituted cyclic alkyl group, a cyclic arylalkyl group, a substituted cyclic arylalkyl group or a multiple ring system;
$R^1$ and $R^2$ may be interconnected to each other, and/or $R^4$ and $R^5$ may be interconnected to each other;
$R^6$ and $R^7$ are independently absent, hydrogen, an alkyl group, halogen, heteroatom or a hydrocarbyl group; and
R* is absent, hydrogen, a Group 14 atom containing group, a halogen, or a heteroatom containing group.

5. The process of claim 4 wherein $R^4$ and $R^5$ are represented by the formula:

Bond to Z or Y wherein $R^8$ to $R^{12}$ are each independently hydrogen, a $C_1$ to $C_{40}$ alkyl group, a halide, a heteroatom, or a heteroatom containing group containing up to 40 carbon atoms, wherein any two R groups may form a cyclic group and/or a heterocyclic group, and wherein the cyclic groups may be aromatic.

6. The process of claim 5 wherein $R^9$, $R^{10}$ and $R^{12}$ are independently a methyl, ethyl, propyl or butyl group.

7. The process of claim 5 wherein $R^9$, $R^{10}$ and $R^{12}$ are methyl groups, and $R^8$ and $R^{11}$ are hydrogen.

8. The process of claim 4 wherein L, Y, and Z are nitrogen, $R^1$ and $R^2$ are a hydrocarbon radical, $R^3$ is hydrogen, and $R^6$ and $R^7$ are absent.

9. The process of claim 4 wherein L and Z are nitrogen, L' is a hydocarbyl radical and $R^6$ and $R^7$ are absent.

10. The process of claim 1 wherein the catalyst system is supported on a carrier.

11. The process of claim 1 wherein the process is a continuous gas phase process.

12. The process of claim 1 wherein the process is a continuous slurry phase process.

13. The process of claim 1 wherein the olefin(s) is ethylene.

14. The process of claim 1 wherein the olefin(s) are ethylene and at least one other monomer having from 3 to 20 carbon atoms.

15. The process of claim 1 wherein the catalyst system comprises an activator.

* * * * *